US010666683B2

(12) United States Patent
Sward et al.

(10) Patent No.: US 10,666,683 B2
(45) Date of Patent: May 26, 2020

(54) USER INTERFACE FOR LOW-TOUCH SECURITY POLICY PROVISIONING (71) Applicant: Cisco Technology, Inc., San Jose, CA (US)

(72) Inventors: David Sward, Gilroy, CA (US); Denis Knjazihhin, Lexington, MA (US); Keying Bi, San Jose, CA (US); David Sounthiraraj, Leander, TX (US); Ashok Javvaji, Austin, TX (US); Jared Smith, Liberty Hill, TX (US); Yedidya Dotan, Newton, MA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 254 days.

(21) Appl. No.: 15/663,757

(22) Filed: Jul. 30, 2017

(65) Prior Publication Data
US 2018/0159899 A1    Jun. 7, 2018

Related U.S. Application Data (60) Provisional application No. 62/431,032, filed on Dec. 7, 2016.

(51) Int. Cl.
H04L 29/06         (2006.01)
G06F 3/0484        (2013.01)
(Continued)

(52) U.S. Cl.
CPC ............ H04L 63/20 (2013.01); G06F 3/0484 (2013.01); G06F 3/04847 (2013.01);
(Continued)

(58) Field of Classification Search
CPC ......... H04L 63/20; H04L 67/34; H04L 63/08; G06F 3/0484; G06F 3/04847; G06F 3/0482
(Continued)

(56) References Cited

U.S. PATENT DOCUMENTS 9,077,611 B2    7/2015 Cordray et al.
9,083,751 B2    7/2015 Chambers et al.
(Continued)

FOREIGN PATENT DOCUMENTS

WO    2017/049387    3/2017

OTHER PUBLICATIONS

Cisco Systems, Inc., Cisco Defense Orchestrator: downloaded Jun. 2017.
(Continued)

Primary Examiner — Evans Desrosiers
(74) Attorney, Agent, or Firm — Polsinelli PC (57) ABSTRACT In one embodiment, a system includes a processor, and a memory to store data used by the processor, the processor being operative to prepare a first user interface including a security policy selection section, interpret user input data to include performing at least one security policy selection action in the security policy selection section yielding selection of a first security policy for a first device, and update the first user interface yielding an updated first user interface including the first security policy, and a first security policy activation key for inputting into a second user interface to be generated when the first device is installed, the first security policy activation key being associated with providing authentication for downloading the first security policy to the first device.

19 Claims, 13 Drawing Sheets (51) Int. Cl.
*H04L 29/08* (2006.01)
*G06F 3/0482* (2013.01)

(52) U.S. Cl.
CPC .............. *H04L 63/08* (2013.01); *H04L 67/34* (2013.01); *G06F 3/0482* (2013.01)

(58) Field of Classification Search
USPC .......................................................... 726/1
See application file for complete search history.

(56) References Cited

U.S. PATENT DOCUMENTS

| 9,317,271 B2 | 4/2016 | McCurdy |
| 9,413,724 B2 | 8/2016 | Xu |
| 2014/0041005 A1* | 2/2014 | He ......................... H04L 63/08 726/7 |
| 2016/0323810 A1 | 11/2016 | May |
| 2017/0041349 A1* | 2/2017 | Ylonen ................. H04L 63/062 |

OTHER PUBLICATIONS

Cisco Systems, Inc.: Cisco Application Engine Server, appendix A (OL-24610-01) Cisco IP Solution Center Infrastructure Reference, 6.0, downloaded Jun. 2017.

Cisco Systems, Inc.; Cisco Plug and Play Application User Guide (OL-27485-01); Apr. 22, 2013.

\* cited by examiner

| Devices & Services | Network Policies | Application Policies | Reports |
|---|---|---|---|

Add a device or service to Defense Orchestrator

| | |
|---|---|
| Live Device | Manage your new device from Defense Orchestrator, right out of the box. |
| *60* New Device Provisioning | 1. Select a policy that you would like to deploy to your new device. |
| Model Device | 2. Generate a registration code for provisioning your device with the selected policy. |
| OpenDNS Organization | 3. Enter the code during "Easy Device Setup" to connect your device to DO and deploy the provisioned policy. |

[ EXIT ]  [ CONTINUE ] — *58*

| Devices & Services | Network Policies | Application Policies | Reports |
|---|---|---|---|

New Device Provisioning

Deploy a secure policy directly to your device during initial setup. Then manage your device's policy using Defense Orchestrator.

*30* Policy                                                                 View Details — *72*

*28* — [ DEFAULT_BRANCH_POLICY_03                            v ] — *62*

*66* — Device Serial *Optional*
[ JAD97000KR ] — *64*

By providing a Device Serial, you can ensure that this will only be deployed to a known device, and it can help you track whether this device has finished connecting to DO.

[ BACK ]  [ FINISH ] — *68*

| Devices & Services | Network Policies | Application Policies | Reports |

New Device Provisioning

Your new device JAD97000KR has been added to Defense Orchestrator. Enter the following code during initial device setup to connect to DO and bootstrap your device with the provisioned policy.

Policy Provisioning Code

32 → [ XJ9E-F29P-YU8X-Z7QL ]   [ 🔗 Copy ] ~70

Policy                                View Details

30 → [ DEFAULT_BRANCH_POLICY_03 ]

Device Serial

66 → [ JAD97000KR ]

[ ADD ANOTHER ]  [ VIEW DEVICES ] ~74

Devices & Services | Network Policies | Application Policies | Reports

Search for Devices and Services by Name, Type, Status, etc...

| NAME | TYPE | STATUS | CONNECTIVITY |
|---|---|---|---|
| Boston Branch A | ASA | Synched | Online |
| Boston HQ FirePOWER | FirePOWER | Synched | Online |
| Boston HQ OpenDNS | OpenDNS | Synched | Online |
| JAD97000KR | FTD | Ready to Deploy | Awaiting connection... |

48 ← Ready to Deploy
54 ← Awaiting connection
44

DETAILS
Name: JAD97000KR
Serial: JAD97000KR

ACTIONS
[RENAME] [REMOVE]

CONFIGURATION

Ready to Deploy
Enter the following code during initial device setup to connect to DO and bootstrap your device with the provisioned policy Policy Provisioning Code
[XJ9E-F29P-YU8X-Z7QL]  ⊘ Copy Policy                              View Details
[DEFAULT_BRANCH_POLICY_03]

LABEL GROUPS AND LABELS 18, 42, 42-1

| Devices & Services | Network Policies | Application Policies | Reports | | |
|---|---|---|---|---|---|
| *Search for Devices and Services by Name, Type, Status, etc...* | | | | + | |
| NAME | TYPE | STATUS | CONNECTIVITY | | |
| Boston Branch A | ASA | Synched | Online | | |
| Boston HQ FirePOWER | FirePOWER | Synched | Online | | |
| Boston HQ OpenDNS | OpenDNS | Synched | Online | | |
| JAD97000KR | FTD | Synched ←48 | Online ←54 | | |

DETAILS
IP: 64.199.154.112
Model: ASA5506-X Threat Defense
Software Version: 6.0.1
Serial: JAD97000KR

ACTIONS
[RENAME]  [REMOVE]

CONFIGURATION
Synched
Your device's configuration is up-to-date.
[READ FROM DEVICE]  [DOWNLOAD]
[VIEW]

LABEL GROUPS AND LABELS

*FIG. 14*

USER INTERFACE FOR LOW-TOUCH SECURITY POLICY PROVISIONING

RELATED APPLICATION INFORMATION

The present application claims priority from U.S. Provisional Patent Application Ser. 62/431,032 of Cisco Technologies Inc. filed 7 Dec. 2016.

TECHNICAL FIELD

The present disclosure generally relates to a user interface for provisioning a security policy for a device.

BACKGROUND

Setting up a newly deployed network security device in a network can be complicated. Less sophisticated users of network security devices may purchase equipment through a vendor that provides various other solutions, such as Internet service, etc. The vendor is sometimes known as a channel partner. The channel partner may be a reseller for a network security device manufacturer.

BRIEF DESCRIPTION OF THE DRAWINGS

The present disclosure will be understood and appreciated more fully from the following detailed description, taken in conjunction with the drawings in which.

DESCRIPTION OF EXAMPLE EMBODIMENTS

Overview

There is provided in accordance with an embodiment of the present disclosure, a system including a processor, and a memory to store data used by the processor, the processor being operative to prepare a first user interface for output to a display device, the first user interface including a security policy selection section, interpret user input data to include performing at least one security policy selection action in the security policy selection section yielding selection of a first security policy for a first device, and update the first user interface yielding an updated first user interface for output to the display device, the updated first user interface including data about the first security policy for the first device, and a first security policy activation key for inputting into a second user interface to be generated when the first device is installed, the first security policy activation key being associated with providing authentication for downloading the first security policy for the first device to the first device.

There is also provided in accordance with another embodiment of the present disclosure, a system including a processor, and a memory to store data used by the processor, the processor being operative to prepare a first user interface for output to a display device, the first user interface including, a plurality of device configuration details, and a security policy activation key input field, interpret user input data to include adding a first security policy activation key in the security policy activation key input field, the first security policy activation key being associated with providing authentication for downloading a first security policy to a first device, and update the first user interface yielding an updated first user interface for output to the display device, the updated first user interface including the first security policy activation key in the security policy activation key input field.

DETAILED DESCRIPTION

By way of introduction, the present disclosure describes setup and configuration of a security device in a customer network. A security policy is typically selected for, or by, the customer remotely, and most likely ahead of delivery of the security device to a customer site. Once the security device is connected to the customer network, an administrator enters an activation key into a user interface. The activation key is authorized by a remote server or a cloud service and the security policy is then downloaded and installed by the security device.

Figure 1:
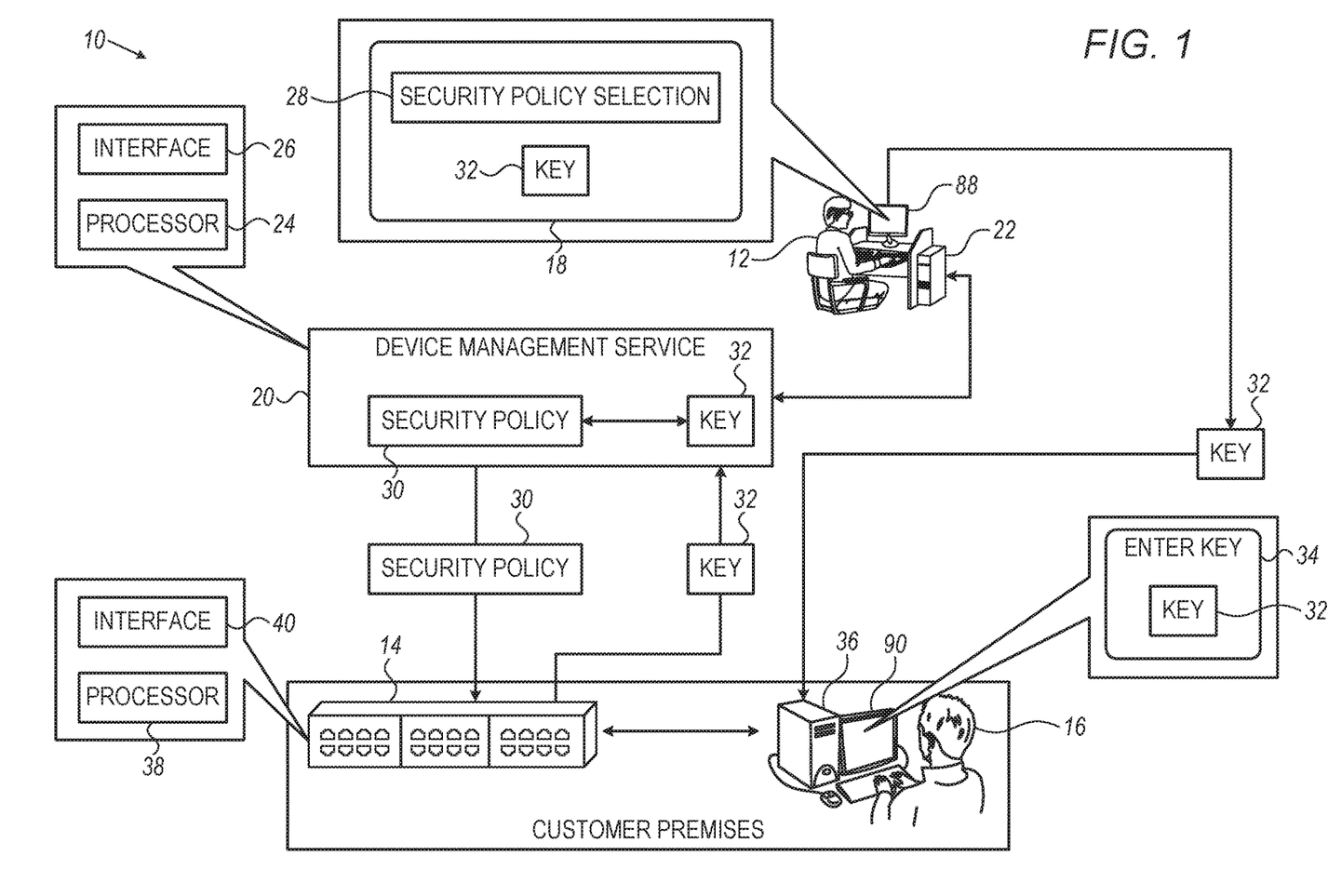
FIG. 1 is a partly pictorial, partly block diagram view of a device configuration system constructed and operative in accordance with an embodiment of the present disclosure.

Reference is now made to FIG. 1, which is a partly pictorial, partly block diagram view of a device configuration system 10 constructed and operative in accordance with an embodiment of the present disclosure.

A channel partner 12 or other party selects a security policy 30 for a security device 14. It should be noted that whenever the term "channel partner" is used herein, the action associated with the channel partner may be performed by a user of the channel partner 12 (as shown in FIG. 1) or any suitable party. The security policy 30 may be selected from a list of security policies, may be configured based on a security policy template (there may be a selectable choice of security policy templates), or may be configured based on a list of security rules. The security policy selection may be performed based on communications between the channel partner 12 and a customer 16 of the customer's security needs, for example by way of discussions between the channel partner 12 and the customer 16 or by receiving customer input through a web-page or another user interface prompting scheme (not shown). The security policy 30, and optionally other configurations, selected by the channel partner 12, is generally specific to the network of the customer 16, typically based on conversations between the channel partner 12 and the customer 16. The customer 16 may have bandwidth constraints, geolocation-specific criteria, risk of exposure to ransomware, and/or information technology (IT) administrator-specific concerns, by way of example only.

The security policy 30 is typically selected via a security policy selection section 28 of a user interface 18. The user interface 18 may run on a device management service 20 or on a local processing device 22 of the channel partner 12. The device management service 20 has also been referred to as a "Defense Orchestrator" or "DO" in the figures. The device management service 20 may be implemented on a particular remote server or may be implemented in a cloud-computing environment. In any event, it will be appreciated that the user interface 18, whether running in the device management service 20 or the local processing device 22, utilizes hardware such as a processor 24 and a data interface 26, described in more detail below with reference to FIGS. 2-6.

The selected security policy 30 for the security device 14 is stored by the device management service 20. The device management service 20 generates a security policy activation key 32, which is linked to the security policy 30 by the device management service 20. The security policy activation key 32 may be an alphanumeric code and/or a cryptographic key, by way of example only. It will be appreciated that the security of the security policy activation key 32 may be a function of the length and/or randomness of the security policy activation key 32.

The security policy activation key 32 is typically sent by the channel partner 12 (or by the device management service 20 on behalf of the channel partner 12), to the customer 16, e.g., a local administrator of the customer. The security policy activation key 32 may be sent by the channel partner 12 or the device management service 20 using any suitable method, for example but not limited to, in an email message, in a text message, in a WhatsApp® message, or encoded as a two-dimension bar code (e.g., quick response (QR) code). The security device 14 is generally shipped by the channel partner 12 to the customer 16.

After the customer 16 receives the security appliance 14, the customer 16 (e.g., a local administrator) connects the security device 14 to a power supply and a network. A printed diagram may be included with the security device 14 that clearly indicates to the customer how to connect the security device 14 to the power supply and/or the network. When the security device 14 is connected to the network, a user interface 34 may be presented to the customer 16 via a computer 36 or other device also connected to the network. The user interface 34 may run in the security device 14 or in the computer 36 (for example, via download of an application running the user interface 34 to the computer 36). Alternatively, the user interface 34 may presented through a webpage served by the device management service 20. In any event, it will be appreciated that the user interface 34, whether running in the security device 14 or the computer 36 or the device management service 20, utilizes hardware such as a processor 38 and a data interface 40, described in more detail below with reference to FIGS. 7-13. The user interface 34 includes various user interface screen presentations enabling setup of the security device 14. The customer 16 invokes a setup procedure through the user interface 34 and enters the security policy activation key 32 received from the channel partner 12. The security device 14 sends the security policy activation key 32 to the device management service 20 where the security policy activation key 32 may be authenticated. The security policy 30 linked to the security policy activation key 32 may be pushed to the security device 14 by the device management service 20. Alternatively, the device management service 20 may send a link to the security device 14 for the security device 14 to download the security policy 30 using the link. The security device 14 then installs and activates the security policy 30 on the security device 14. It should be noted that a security configuration might also be generated by the channel partner 12 at the same time that the security policy 30 is generated for later download and installation by the security device 14.

The security device 14 may provide security functionality in a network. The security device 14 may be called a network security device. The security device 14 may be a firewall device or a web security appliance (WSA), by way of example only. It will be appreciated that the device configuration system 10 may be used to provision a security policy, and optionally other configurations, to any suitable device.

In accordance with an alternative embodiment, the security device 14 may generate a user interface screen presentation (not shown) to a connected user device. The customer 16 enters an IP address assignment and the security policy activation key 32 for the security device 14 into the user interface screen presentation. The security device 14 connects to the device management service 20, supplies the security policy activation key 32, and retrieves the security policy 30.

The channel partner 12 may continue to manage the security device 14 on the device management service 20 after the initial configuration of the security device 14 in which the security policy is installed using suitable user interface screen presentations. In another example, the channel partner 12 installs the security policies and then disconnects from the security device 14 and provides no further management.

Reference is now made to FIGS. 2-6, which are views of user interface screen presentations 42 of the user interface 18 for use in the device configuration system 10 of FIG. 1. The data interface 26 (FIG. 1) is operative to receive user input data from at least one input device, for example, but not limited to, a keyboard, mouse, and/or touch screen display. The processor 24 (FIG. 1) is operative to prepare the user interface screen presentations 42 of the user interface 18 for output to a display device 88 (FIG. 1), for example, but not limited to a computer monitor, a mobile device screen or a tablet screen.

Figure 2:
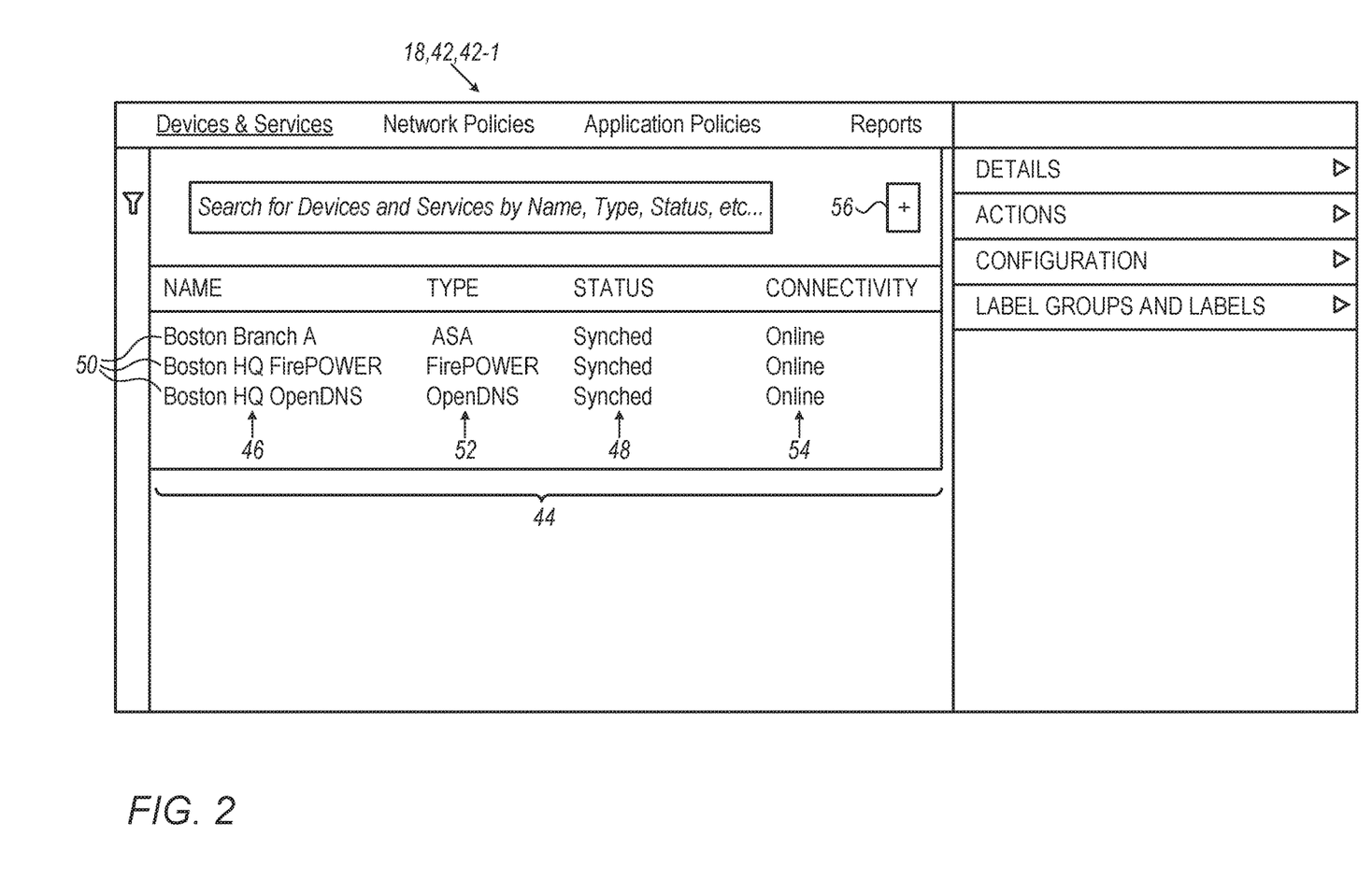
FIGS. 2-6 are views of user interface screen presentations of a first user interface for use in the device configuration system of FIG. 1.

FIG. 2 shows a user interface screen presentation 42-1 of the user interface screen presentations 42. User interface screen presentation 42-1 of the user interface 18 includes a device-status list 44, which includes a list 46 of a plurality of devices 50 and a status indicator 48 indicating, for each device 50, a deployment status of a security policy for the device 50. The deployment status may be listed, by way of example only, as "Synched" when the security policy has already been deployed, and as "Ready to Deploy" when the security policy is awaiting download to the device 50. It will be appreciated that other statuses may be used to describe the above two states and other statuses may be added to describe other deployment states, for example, but not limited to, "Downloading" and "Installing". The device-status list 44 also includes a device type indicator 52 and a connectivity indicator 54, which indicates whether a device is awaiting connection or is online. The user interface screen presentation 42-1 includes a selection control element 56, shown as a "+" symbol in the example of FIG. 2, for adding a new device or service. It will be appreciated that the "+" symbol may be replaced by any suitable symbol indicating adding a new device or service. Selecting the selection control element 56 activates a new user interface screen presentation 42-2 of the user interface screen presentations 42 described below with reference to FIG. 3.

Figure 3:
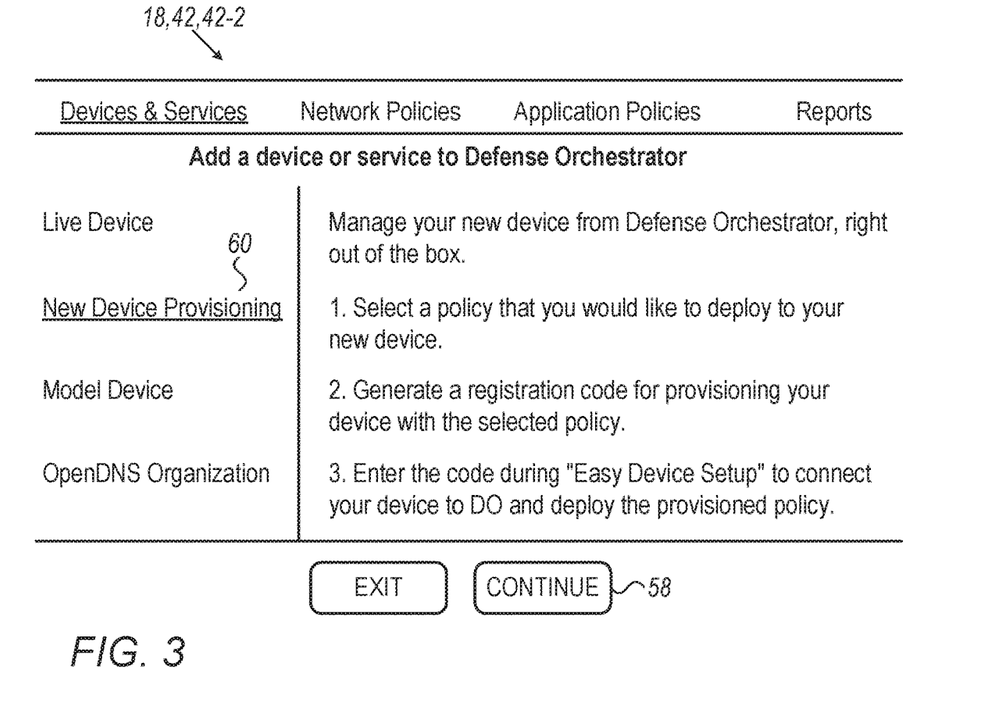

FIG. 3 shows the exemplary user interface screen presentation 42-2 of the user interface screen presentations 42. User interface screen presentation 42-2 of the user interface 18 includes several options including "New Device Provisioning" (block 60). To add a new device (for example, the security device 14), the channel partner 12 selects "New Device Provisioning" (block 60) and then selects a continue control element 58, which activates a new user interface screen presentation 42-3 of the user interface screen presentations 42 described below with reference to FIG. 4.

Figure 4:
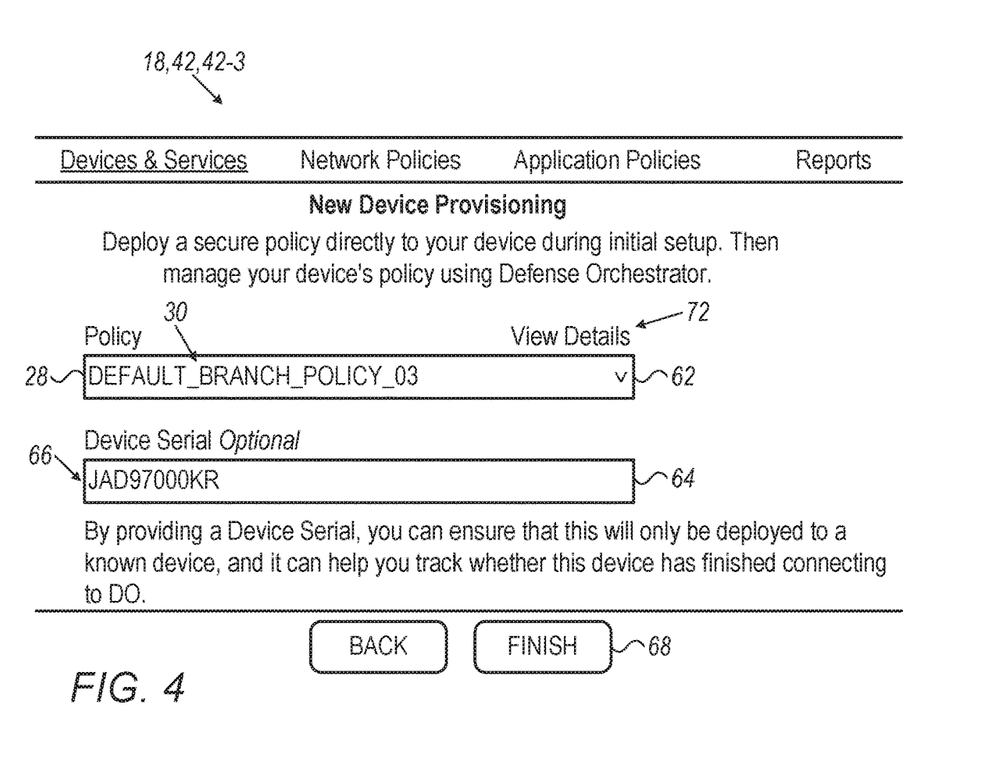

FIG. 4 shows the user interface screen presentation 42-3 of the user interface 18 including the security policy selection section 28. The security policy selection section 28 includes a selection mechanism 62 (for example, via a pull down menu) allowing selection of the security policy 30 from a plurality of security policies (not shown). In accordance with an alternative embodiment, the security policy selection section 28 includes a list of a plurality of configurable security rules that may be provided from a security policy template. An action, for example, "block" or "allow" may be associated with each of the security rules. The security policy selection section 28 may allow new rules to be added.

Selecting the security policy 30 generates user input data for receipt by the data interface 26 (FIG. 1). The processor 24 (FIG. 1) is operative to interpret the user input data, received by the data interface 26 (FIG. 1), to include performing at least one security policy selection action in the security policy selection section 28 yielding selection of the security policy 30 for the security device 14 (FIG. 1). The user interface screen presentation 42-3 optionally includes a selectable item 72 to select a details screen (not shown) to show the details of the selected security policy 30.

The user interface screen presentation 42-3 of the user interface 18 optionally includes a serial number input field 64. Typing a serial number 66 in the serial number input field 64 generates user input data for receipt by the data interface 26 (FIG. 1). The processor 24 (FIG. 1) is operative to interpret the user input data to include adding the serial number 66 in the serial number input field 64. The serial number 66 may also be used by the device management service 20 (FIG. 1) as a device name for the security device 14 (FIG. 1). The device management service 20 may be operative to assign whatever data is input into the serial number input field 64 as a device name for the security device 14 (FIG. 1) even if the data that is input is not a serial number known to the device management service 20. In accordance with alternative embodiment, the user interface screen presentation 42-3 may optionally include, in addition to, or instead of, the serial number input field 64, a device name input field for naming the security device 14 (FIG. 1). Entering the device serial number into the serial number input field 64 might enable the device management service 20 to associate the security policy 30 to the security device 14 (FIG. 1) so that the security policy 30 is deployed to a known device. The channel partner 12 then selects a finish control element 68, which activates a new user interface screen presentation 42-4 of the user interface screen presentations 42, described below with reference to FIG. 5, representing a further update of the user interface 18 by the processor 24 (FIG. 1).

Figure 5:
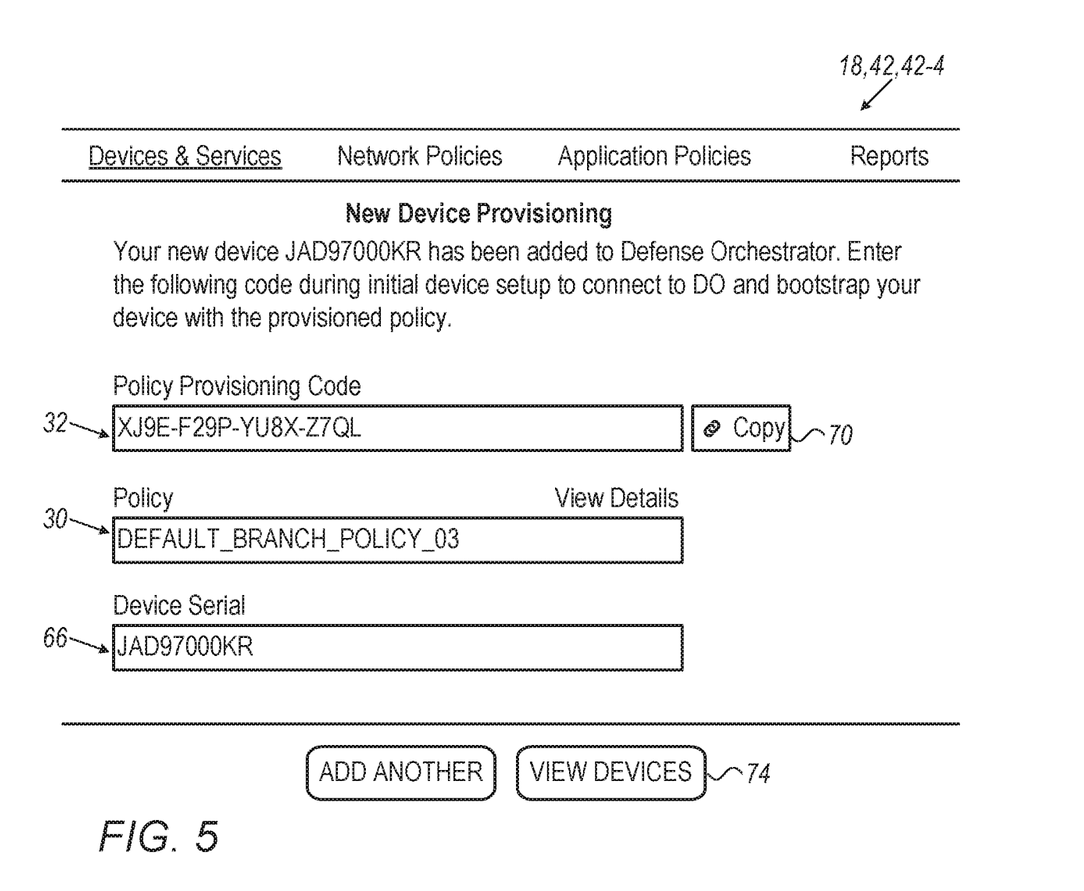

FIG. 5 shows the user interface screen presentation 42-4 of the user interface 18 including: data about the selected security policy 30 for the security device 14 (FIG. 1), the serial number 66; and the security policy activation key 32 (which may also be known as a "policy provisioning code") for inputting into the user interface 34 (FIG. 1 and described in more detail with reference to FIG. 12) to be generated when the security device 14 is installed. As described above with reference to FIG. 1, the security policy activation key 32 is associated with providing authentication for downloading the security policy 30 for the security device 14 to the security device 14 (FIG. 1).

The channel partner 12 (FIG. 1) may copy the security policy activation key 32 from the user interface screen presentation 42-4 for sending to the customer 16 (FIG. 1) as described above with reference to FIG. 1. Copying the security policy activation key 32 to a data buffer may be performed using a selection and copy action. The user interface screen presentation 42-4 optionally includes a selectable control element 70. Selecting the selectable control element 70 by the channel partner 12 generates user input data for receipt by the data interface 26 (FIG. 1). The processor 24 (FIG. 1) is operative to interpret the user input data to include selecting the selectable control element 70. The processor 24 (FIG. 1) is operative, in response to interpreting the user input data to include selecting the selectable control element 70, to copy the security policy activation key 32 to a data buffer. It will be appreciated that other shortcut keys or control elements may be used to copy the security policy activation key 32 into a message, for example, but not limited to, an email, a text message, or a WhatsApp® message. The message is optionally addressed to the customer 16 by the user interface 18. Selecting a "view devices" control element 74 activates an updated version of the user interface screen presentation 42-1 of FIG. 1 described in more detail with reference to FIG. 6.

Figure 6:
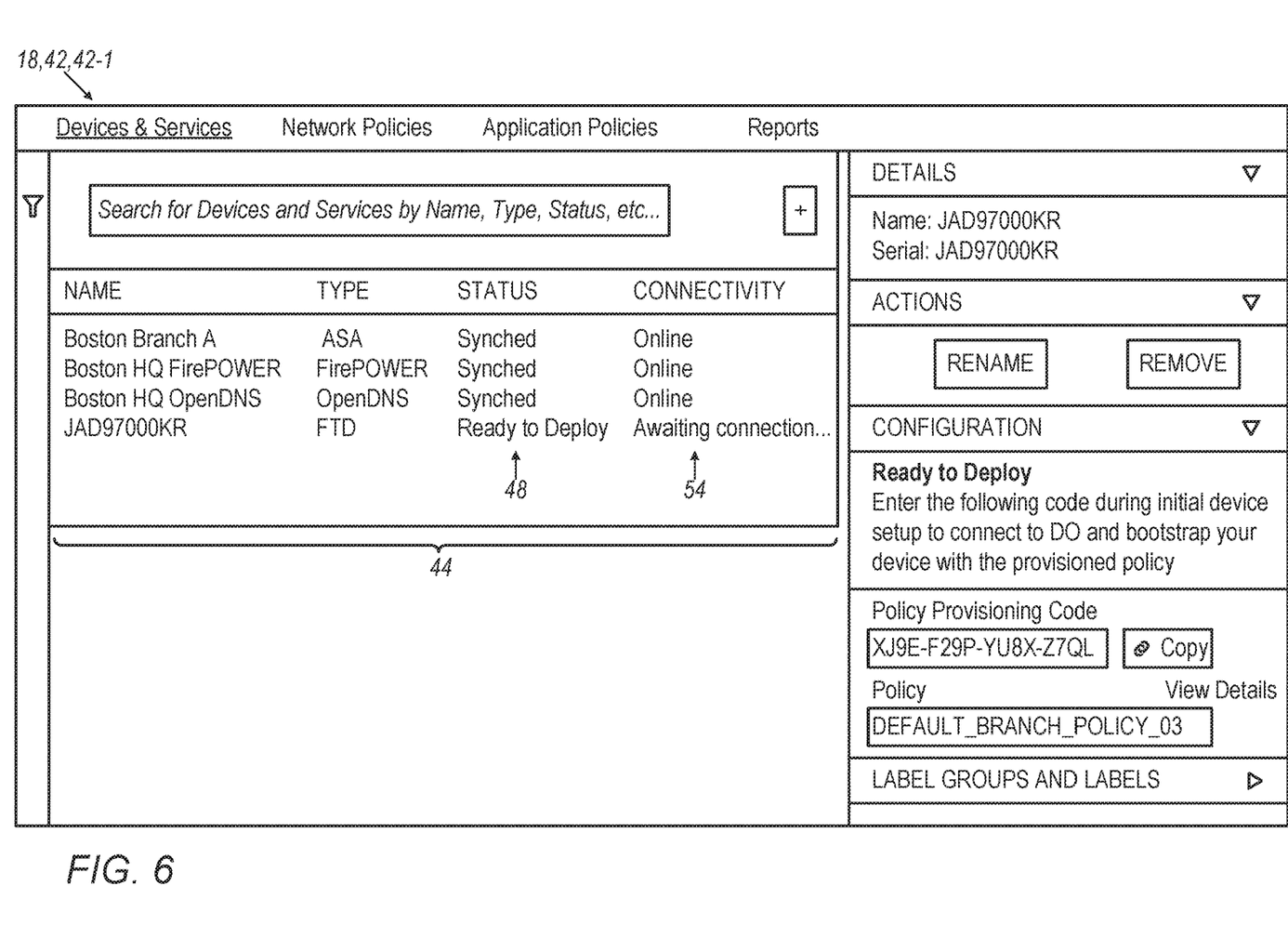

FIG. 6 shows the user interface screen presentation 42-1 including the addition of the security device 14 (FIG. 1) to the device-status list 44. The status indicator 48 of the security device 14 is listed as "Ready to Deploy" and the connectivity indicator 54 of the security device 14 is listed as "Awaiting Connection". The status indicator 48 and the connectivity indicator 54 are updated during installation of the security device 14, described in more detail with reference to FIGS. 7-13 below.

Figure 7:
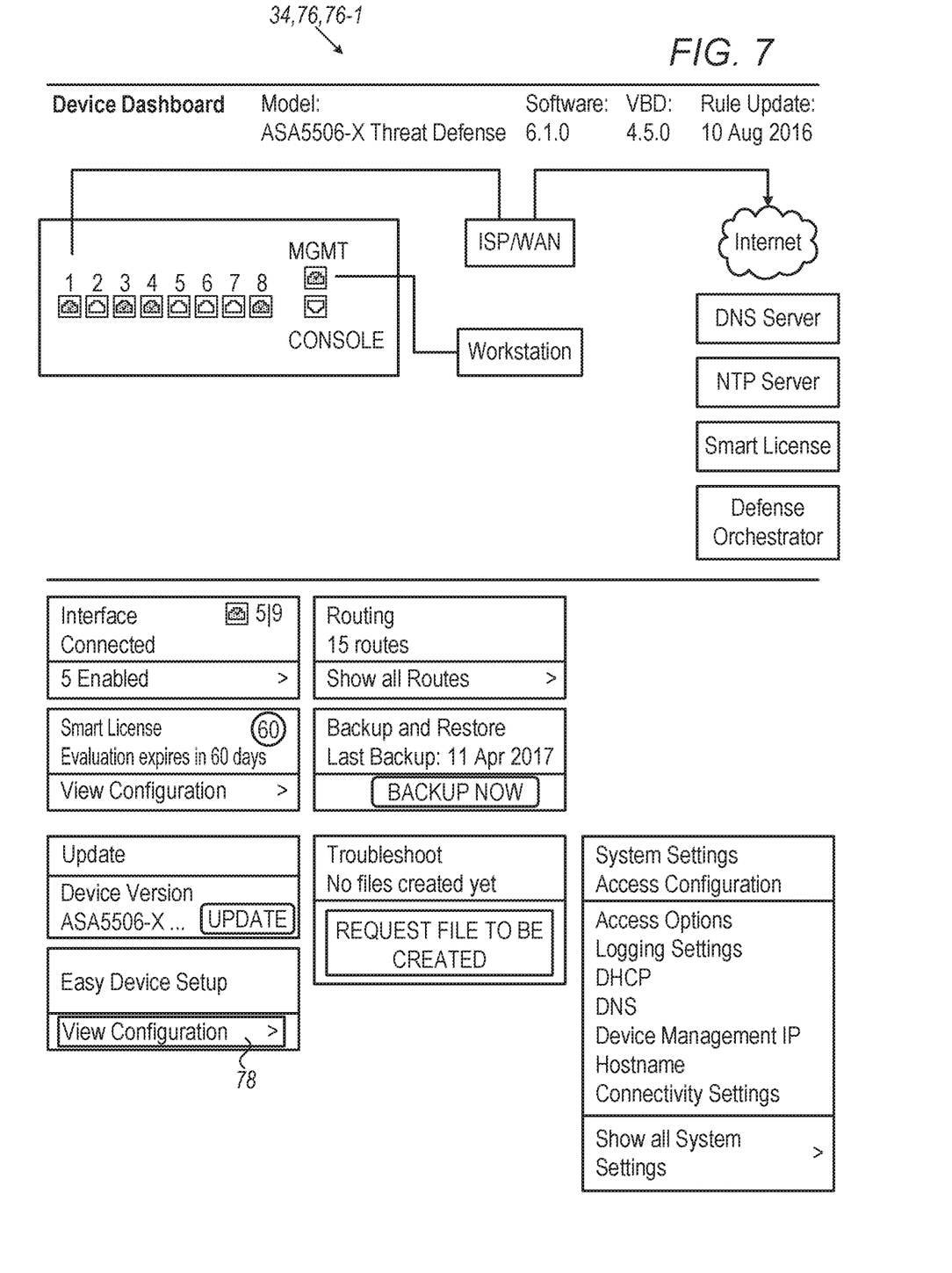
FIGS. 7-13 are views of user interface screen presentations of a second user interface for use in the device configuration system of FIG. 1.
Figure 8:
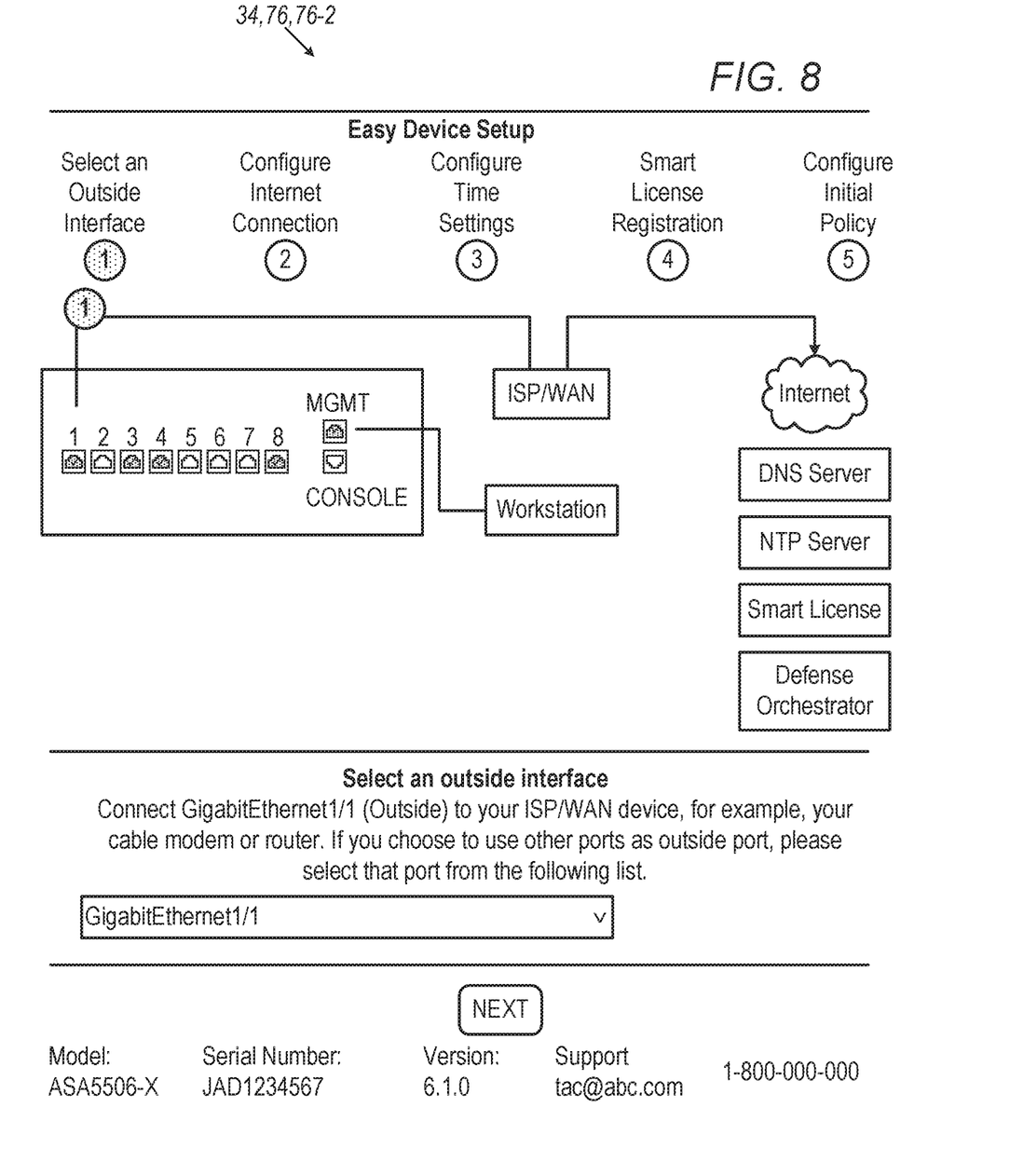
Figure 9:
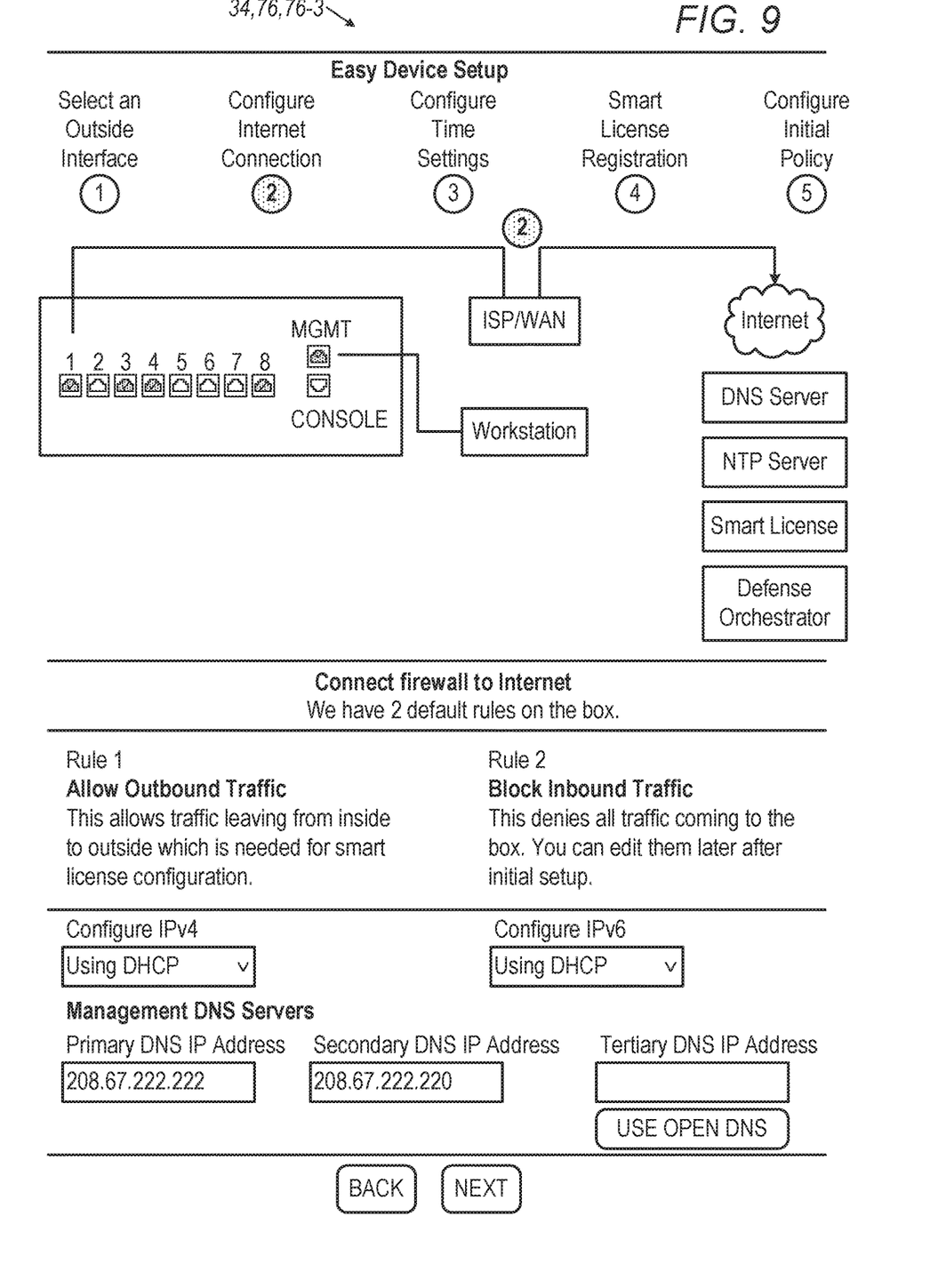
Figure 10:
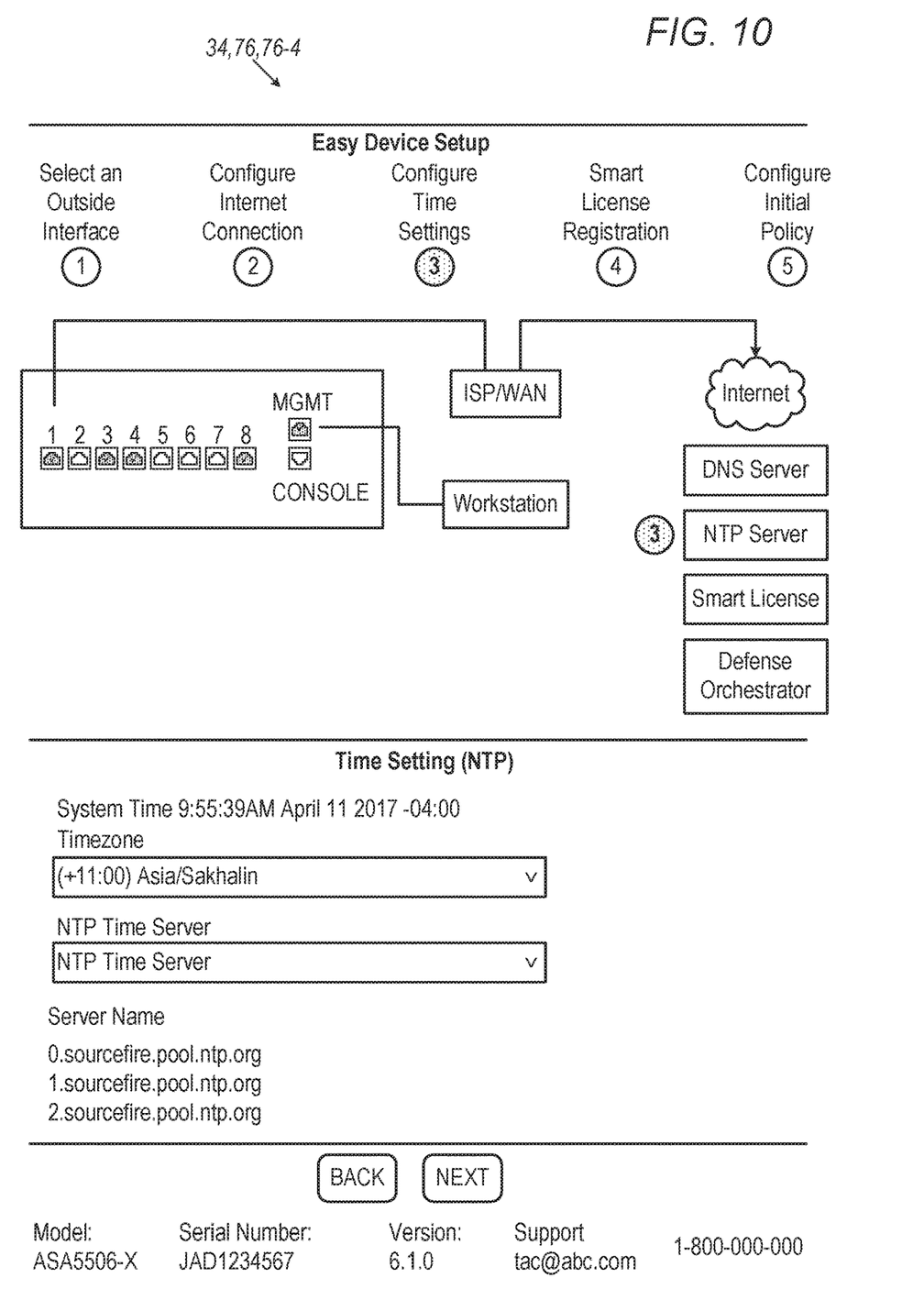
Figure 11:
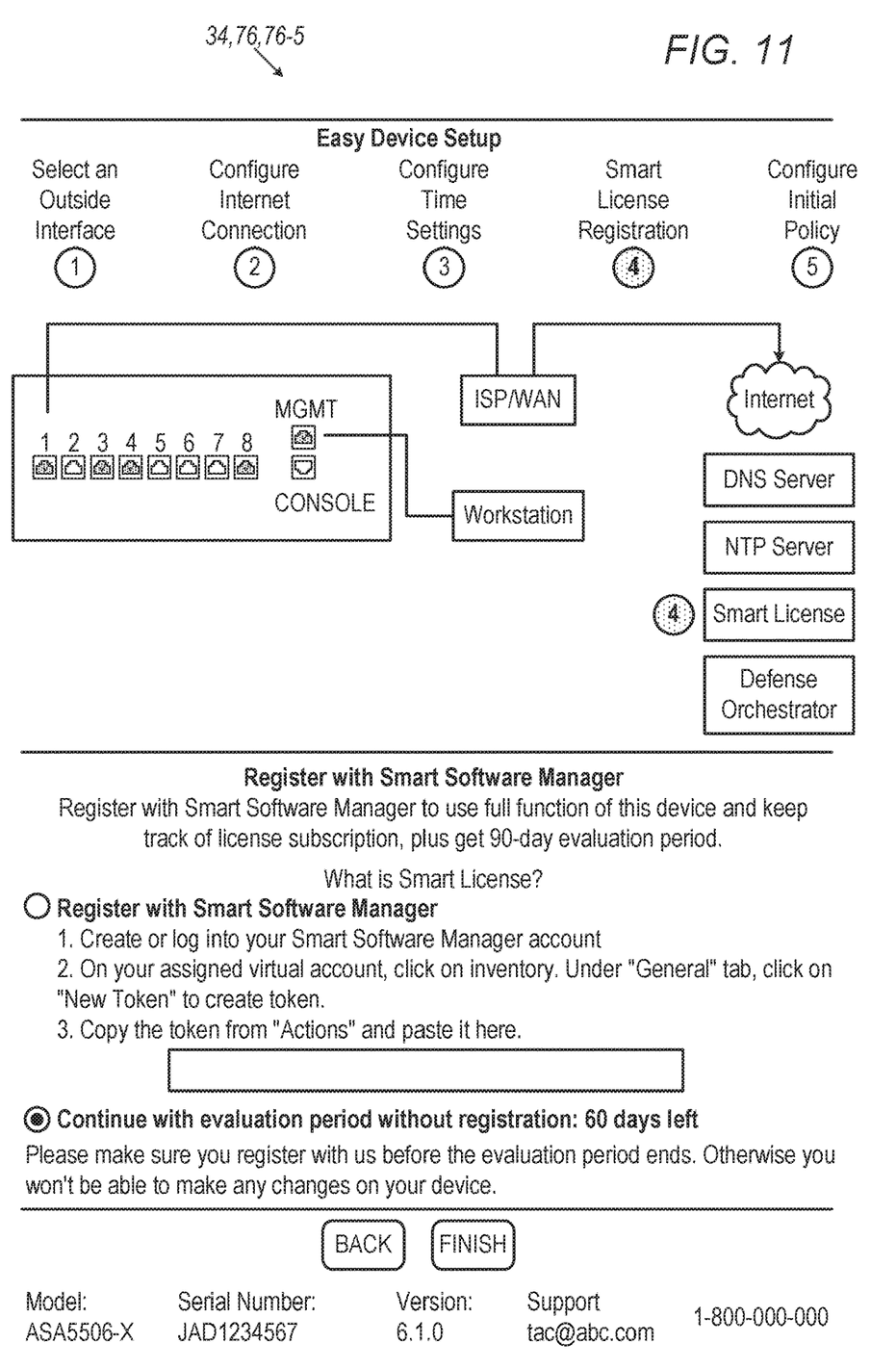

Reference is now made to FIGS. 7-13, which are views of user interface screen presentations 76 of the user interface 34 for use in the device configuration system 10 of FIG. 1. The user interface screen presentations 76 are examples of user interface screen presentations presented to an on-site administrator or other party of the customer 16 during installation of the security device 14 (FIG. 1) and generally include device configuration details. The data interface 40 (FIG. 1) is operative to receive user input data from at least one input device, for example, but not limited to, a keyboard, mouse, touch screen display, and/or a two-dimensional bar code scanner. The processor 38 (FIG. 1) is operative to prepare the user interface screen presentations 76 of the user interface 34 for output to a display device 90 (FIG. 1), for example, but not limited to a computer monitor, a mobile device screen or a tablet screen. FIG. 7 shows a user interface screen presentation 76-1, which is an initial setup screen from which a user can select an Easy Device Setup control element 78. FIGS. 8-11 show various user interface screen presentations 76-2, 76-3, 76-4, and 76-5, respectively. The user interface screen presentations 76-2, 76-3, 76-4, and 76-5 allow configuration of an interface, IP/DHCP address information, time-zone information, and licensing information, respectively.

Figure 12:
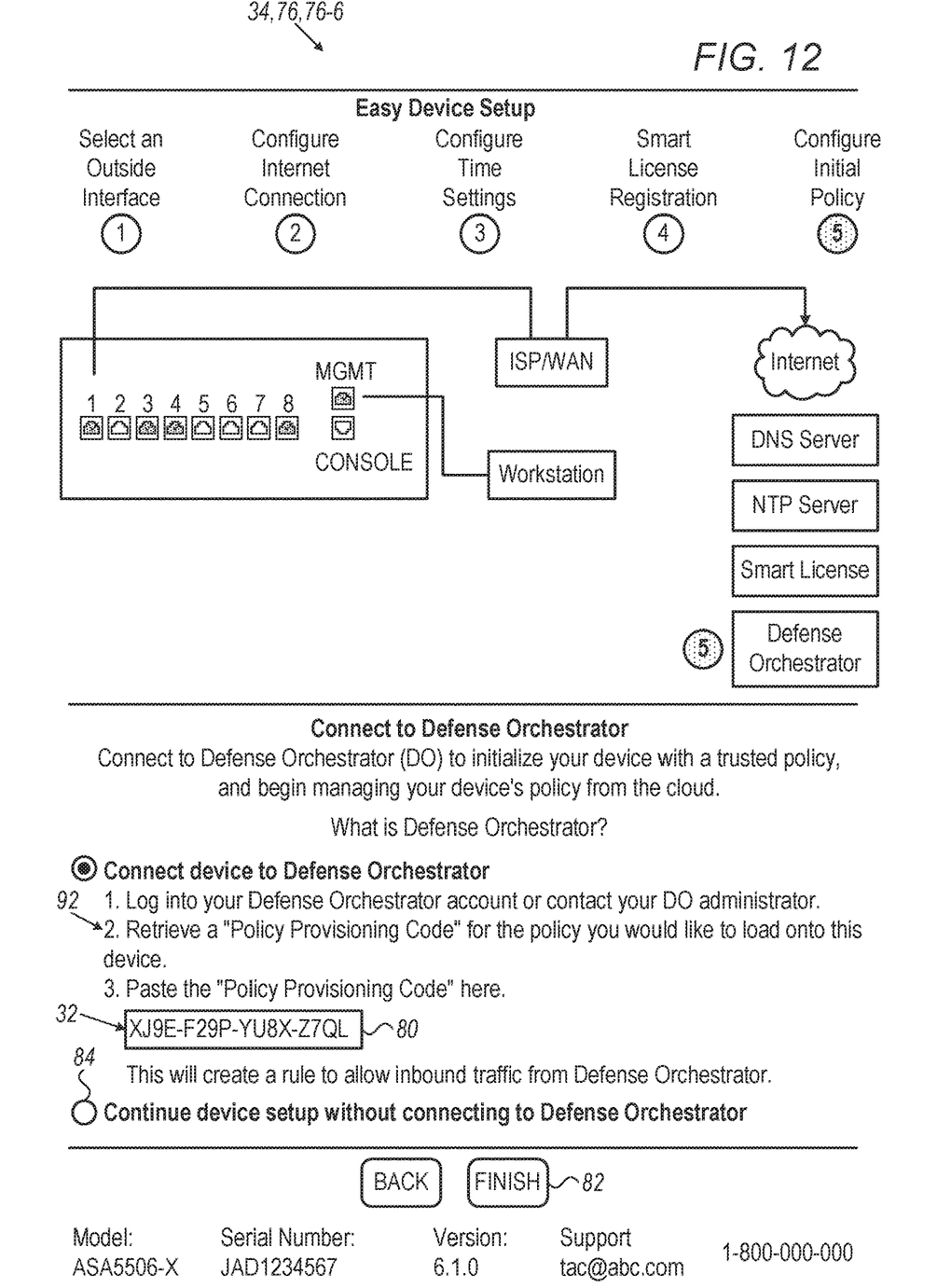

FIG. 12 shows a user interface screen presentation 76-6 of the user interface screen presentations 76 of the user interface 34. Among other details shown on the user interface screen presentation 76-6, the user interface screen presentation 76-6 includes a security policy activation key input field 80 and optionally instructions 92 on how to obtain the security policy activation key 32.

Entering the security policy activation key 32 into the security policy activation key input field 80 generates user input data for receipt by the data interface 40 (FIG. 1). The processor 38 (FIG. 1) is operative to interpret the user input data, received by the data interface 40 (FIG. 1), to include adding the security policy activation key 32 in the security policy activation key input field 80. The processor 38 (FIG. 1) is operative to update the user interface screen presentation 76-6 of the user interface 34 for output to the display device 90 (FIG. 1). The updated user interface 34 includes the security policy activation key 32 in the security policy activation key input field 80. In accordance with an alternative embodiment, a two-dimensional barcode of the security policy activation key 32 may be scanned instead of typing the security policy activation key 32 into the security policy activation key input field 80.

Selecting a "finish" control element 82 activates the next stage of the installation process wherein the processor 38 (FIG. 1) instructs the data interface 40 (FIG. 1) to send the security policy activation key 32 to the device management service 20 (FIG. 1) and download the security policy 30 (FIG. 1) to the security device 14 (FIG. 1) as described in more detail above with reference to FIG. 1.

The user interface screen presentation 76-6 of the user interface 34 optionally includes a selectable option 84 for continuing configuration of the security device 14 (FIG. 1) without downloading the security policy 30 (FIG. 1) to the security device 14 (FIG. 1). This option may be thought of as "zero-touch provisioning", whereas entering the security policy activation key 32 to activate download and installation of the security policy 30 (FIG. 1) may be thought of as a "low-touch provisioning".

Figure 13:
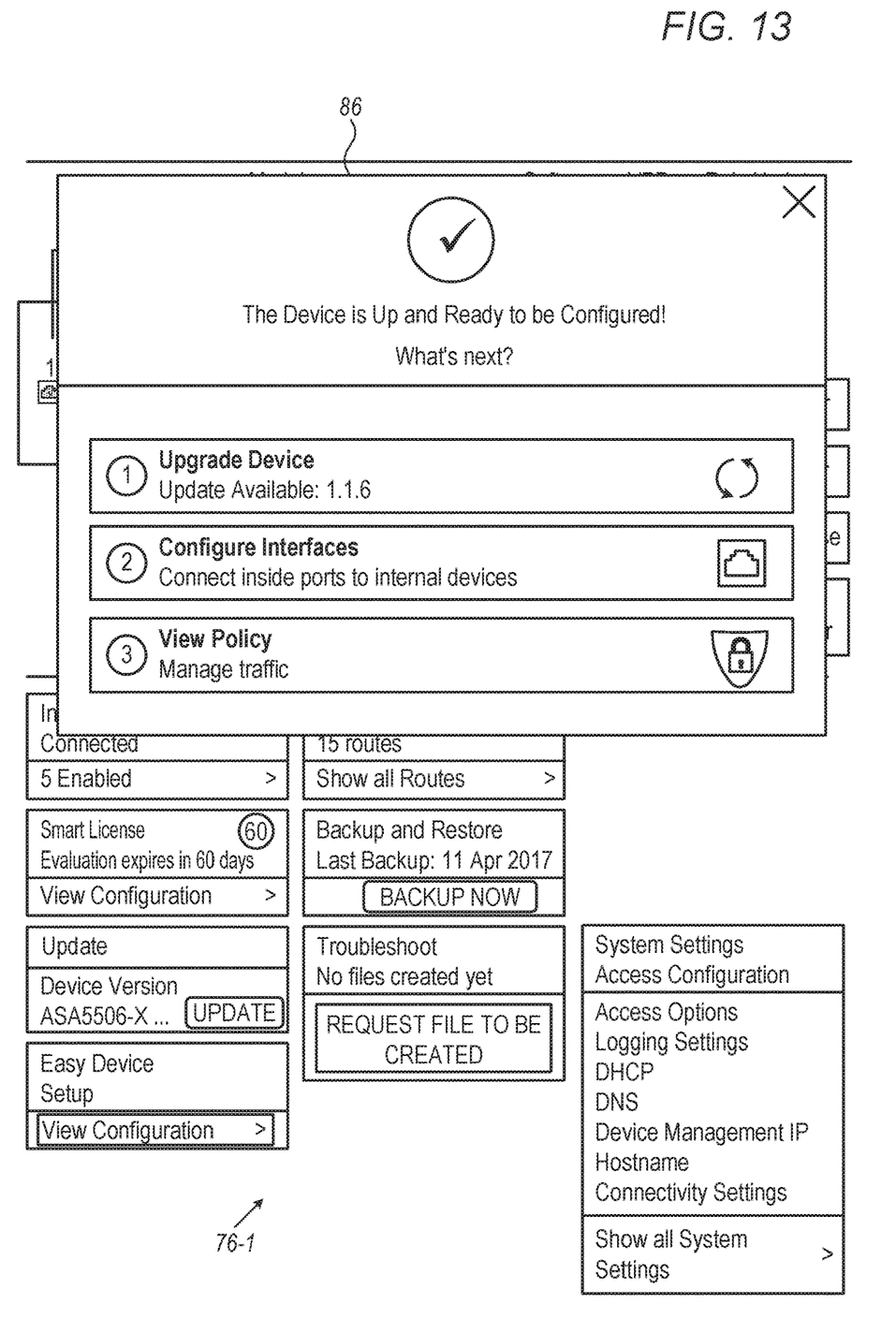

FIG. 13 shows the user interface screen presentation 76-1 with an overlay 86 indicating successful completion of the installation process as well as showing possible next steps in managing the security device 14 (FIG. 1).

Figure 14:
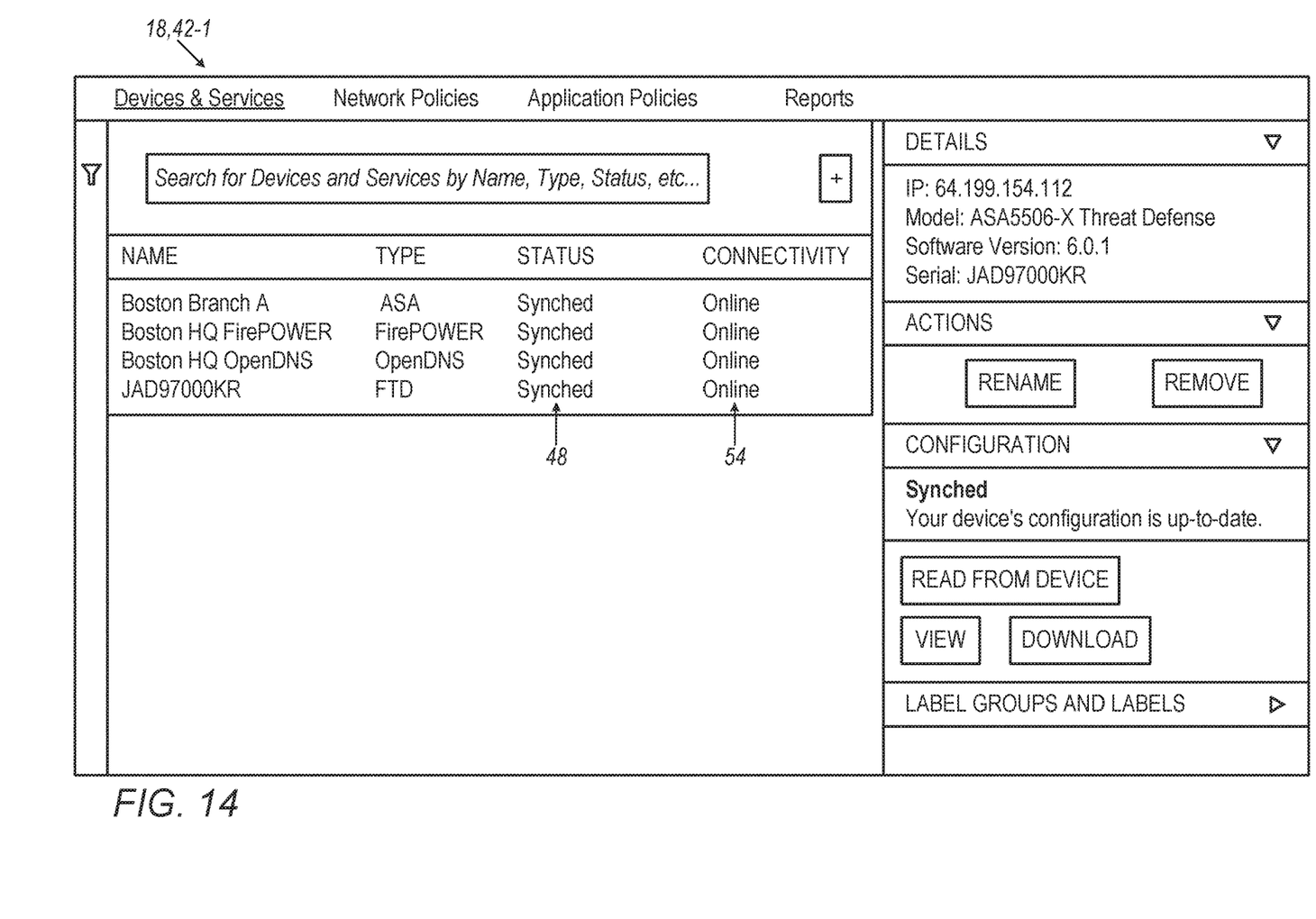
FIG. 14 is a view of another user interface screen presentation of the first user interface for use in the device configuration system of FIG. 1.

Reference is now made to FIG. 14, which is a view of the user interface screen presentation 42-1 of the user interface 18 for use in the device configuration system 10 of FIG. 1. After installation of the security device 14 (FIG. 1), the status indicator 48 of the security device 14 is listed as "Synched" and the connectivity indicator 54 of the security device 14 is listed as "Online".

It will be appreciated that there may be situations in which the customer 16 is sophisticated enough to configure the security device 14 themselves. In this situation, the channel partner 12 may not be included in the above process described with reference to FIGS. 1-14. Instead, the flow may be as follows. The customer 16 orders the security device 14. Thereafter, the customer 16 is given access to a secure area (e.g., webpage), after ordering, to configure the security device 14. The configuration may be performed via a user interface, which is similar to, or the same as, the user interface 18 of FIGS. 2-6, 14. The device management service 20 may be operative to suggest policies and configurations based on characteristics of the customer's network (entered by a local network administrator of the customer 16), covering various relevant aspects of device configuration, allowing the customer to configure the device based on their needs (in much the same way that a channel partner 12 selects a policy according to the techniques described above). The security policy activation key 32 may be copied by the channel partner 12 and used when installing the security device 14 via the user interface 34 of FIGS. 7-13 as described above.

In practice, some or all of the functions of the processor 24, 38 may be combined in a single physical component or, alternatively, implemented using multiple physical components. These physical components may comprise hard-wired or programmable devices, or a combination of the two. In some embodiments, at least some of the functions of the processing circuitry may be carried out by a programmable processor under the control of suitable software. This software may be downloaded to a device in electronic form, over a network, for example. Alternatively or additionally, the software may be stored in tangible, non-transitory computer-readable storage media, such as optical, magnetic, or electronic memory.

It is appreciated that software components may, if desired, be implemented in ROM (read only memory) form. The software components may, generally, be implemented in hardware, if desired, using conventional techniques. It is further appreciated that the software components may be instantiated, for example: as a computer program product or on a tangible medium. In some cases, it may be possible to instantiate the software components as a signal interpretable by an appropriate computer, although such an instantiation may be excluded in certain embodiments of the present disclosure.

It will be appreciated that various features of the disclosure which are, for clarity, described in the contexts of separate embodiments may also be provided in combination in a single embodiment. Conversely, various features of the disclosure which are, for brevity, described in the context of a single embodiment may also be provided separately or in any suitable sub-combination.

It will be appreciated by persons skilled in the art that the present disclosure is not limited by what has been particularly shown and described hereinabove. Rather the scope of the disclosure is defined by the appended claims and equivalents thereof.

What is claimed is:

1. A system comprising: a processor; and a memory to store data used by the processor, the processor being operative to:
   prepare a first user interface for output to a display device, the first user interface including a security policy selection section allowing selection of a security policy from a plurality of security policies to apply to a first device;
   receive a selection of at least one security policy selection action in the security policy selection section yielding selection of a first security policy for the first device; and
   update, in response to the receive, the first user interface yielding an updated first user interface for output to the display device, the updated first user interface including:
      data about the first security policy for the first device; and
      a first security policy activation key for inputting into a second user interface to be generated when the first device is installed, the first security policy activation key being associated with providing authentication for downloading the first security policy for the first device to the first device.

2. The system according to claim 1, further comprising a data interface to receive the user input data from at least one input device external to the system.

3. The system according to claim 1, wherein:
   the first user interface includes a serial number input field;
   the processor is operative to interpret the user input data to include: adding a first serial number in the serial number input field; and
   the updated first user interface to include the first serial number.

4. The system according to claim 1, wherein the first user interface includes a device-status list, which includes:
   a list of a plurality of devices; and
   a status indicator indicating, for each one device of the plurality of devices, a deployment status of a security policy for the one device.

5. The system according to claim 1, wherein:
   the updated first user interface includes a selectable control element;

the processor is operative to interpret the user input data to include selecting the selectable control element; and the processor is operative, in response to interpreting the user input data to include selecting the selectable control element, to copy the first security policy activation key to a data buffer.

6. A system comprising: a processor; and a memory to store data used by the processor, the processor being operative to:

prepare a first user interface for output to a display device, the first user interface including; a plurality of device configuration details; and a security policy activation key input field allowing selection of a security policy from a plurality of security policies to apply to a first device;

receive a selection of a first security policy activation key in the security policy activation key input field, the first security policy activation key being associated with providing authentication for downloading a first security policy to the first device; and update, in response to the receive, the first user interface yielding an updated first user interface for output to the display device, the updated first user interface including the first security policy activation key in the security policy activation key input field.

7. The system according to claim 6, wherein the first user interface includes a user interface presentation including: the security policy activation key input field; and a selectable option for continuing configuration of the first device without downloading the first security policy to the first device.

8. The system according to claim 6, wherein the first user interface includes instructions on how to obtain the first security policy activation key.

9. The system according to claim 6, further comprising a data interface to: send the first security policy activation key to a server; and download the first security policy to the first device.

10. A method comprising:

preparing a first user interface for output to a display device, the first user interface including a security policy selection section allowing selection of a security policy from a plurality of security policies to apply to a first device;

receive a selection of at least one security policy selection action in the security policy selection section yielding selection of a first security policy for the first device; and updating, in response to the receiving, the first user interface yielding an updated first user interface for output to the display device, the updated first user interface including: data about the first security policy for the first device; and a first security policy activation key for inputting into a second user interface to be generated when the first device is installed, the first security policy activation key being associated with providing authentication for downloading the first security policy for the first device to the first device.

11. The method according to claim 10, wherein:

the first user interface includes a serial number input field;

the method further comprises interpreting the user input data to include: adding a first serial number in the serial number input field; and the updated first user interface to include the first serial number.

12. The method according to claim 10, wherein the first user interface includes a device-status list, which includes:

a list of a plurality of devices; and a status indicator indicating, for each one device of the plurality of devices, a deployment status of a security policy for the one device.

13. The method according to claim 10, wherein:

the updated first user interface includes a selectable control element;

the method further comprises: interpreting the user input data to include selecting the selectable control element; and in response to interpreting the user input data to include selecting the selectable control element, copying the first security policy activation key to a data buffer.

14. The method according to claim 10, wherein the security policy selection section includes a selection mechanism allowing selecting the first security policy from a plurality of security policies.

15. The method according to claim 10, wherein the security policy selection section includes a list of a plurality of configurable security rules.

16. A non-transitory computer readable media storing instructions which when executed cause a system to perform operations comprising:

preparing a first user interface for output to a display device, the first user interface including a security policy selection section allowing selection of a security policy from a plurality of security policies to apply to a first device;

receive a selection of at least one security policy selection action in the security policy selection section yielding selection of a first security policy for the first device; and updating, in response to the receiving, the first user interface yielding an updated first user interface for output to the display device, the updated first user interface including: data about the first security policy for the first device; and a first security policy activation key for inputting into a second user interface to be generated when the first device is installed, the first security policy activation key being associated with providing authentication for downloading the first security policy for the first device to the first device.

17. The media according to claim 16, wherein:

the first user interface includes a serial number input field;

the method further comprises interpreting the user input data to include: adding a first serial number in the serial number input field; and the updated first user interface to include the first serial number.

18. The method according to claim 16, wherein the first user interface includes a device-status list, which includes:

a list of a plurality of devices; and a status indicator indicating, for each one device of the plurality of devices, a deployment status of a security policy for the one device.

19. The method according to claim 16, wherein:

the updated first user interface includes a selectable control element;

the method further comprises: interpreting the user input data to include selecting the selectable control element; and in response to interpreting the user input data to include selecting the selectable control element, copying the first security policy activation key to a data buffer.

* * * * *